March 31, 1970   JEAN-CLAUDE RAMOND   3,503,503
APPARATUS FOR THE PURIFICATION OF LIQUID SUSPENSIONS
Filed July 5, 1968
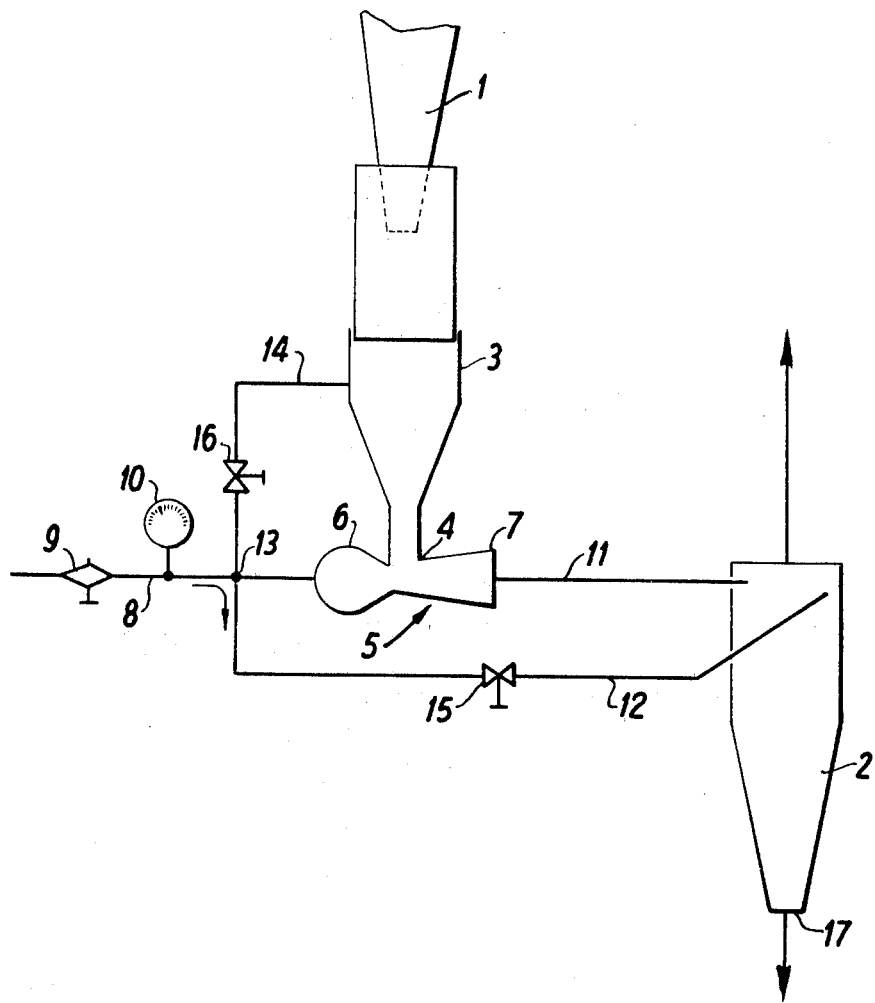
INVENTOR.
JEAN-CLAUDE RAMOND
BY
Morgan, Finnegan, Durham & Pine
ATTORNEYS

United States Patent Office 3,503,503
Patented Mar. 31, 1970

3,503,503
APPARATUS FOR THE PURIFICATION OF LIQUID SUSPENSIONS
Jean-Claude Ramond, 21 Rue Laurin, 92 Rueil-Malmaison, France
Filed July 5, 1968, Ser. No. 742,917
Claims priority, application France, July 5, 1967, 113,173
Int. Cl. B03d 1/24
U.S. Cl. 209—211                        3 Claims

ABSTRACT OF THE DISCLOSURE

In apparatus for the purification of suspensions of the type in which the rejects of one stage of purification are treated by a following purification stage, a rejects collector is provided between two successive stages of purification, connected at its bottom to the neck of a venturi. The entrance of the venturi is connected to a source of pressurized water, and the discharge thereof is connected to the upper part of the following stage.

Background and objects of the invention

The present invention relates generally to apparatus for the purification of a suspension, such as paper pulp, and relates more particularly to a new and improved construction and arrangement in such apparatus.

Paper pulp purification installations generally serve to separate out the impurities continuously from a suspension of fibers in water by mounting the cleaners in a cascade arrangement (multiple stages). Each cleaner is usually comprised of an inlet feed which is attached to the upper end of a cylindrical part, the latter being attached to a conical part of which the geometrical apex is situated at the base.

Such an installation is generally arranged in such a manner as to comprise multiple stages, of which each stage is treating the rejects from the preceding stage.

Generally, the rejects from one stage are collected in a reservoir and delivered to the following stage by means of a pump finally permitting, by the treatment in the last stage, the recovery of the greater part of the solid materials, generally having a specific weight less than the rejects.

The recovery of the rejects into the different stages by means of a pump is a costly operation, by reason of the electric power consumed and is relatively inflexible.

It is therefore an object of the present invention to provide a new and improved purification apparatus for liquid suspensions and the like.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

Briefly described, the present invention relates to an improved apparatus for the purification of suspensions, characterized essentially by the fact that it comprises the provision of a venturi between two successive stages of known purification apparatus, the neck of which is attached to the reject discharge of the preceding cleaner and the discharge of which is attached to the feed of the following cleaner, the entrance of the venturi being attached to a liquid, generally water, under pressure.

By means of this arrangement, it is possible to eliminate the pumps which have heretofore generally been used between the purification stages in installations operating in a continuous manner.

In a preferred embodiment of the invention, a branch from a source of pressurized water is taken off ahead of the venturi and is attached to the inlet of the following cleaner, which can permit the regulation of the flow and pressure of feed to the following cleaner, and by so doing regulate the quantity of rejects to be evacuated.

It is advantageous to also take another branch from the source of pressurized water and attach it to the reject collector ahead of the venturi, thereby providing dilution and preventing plugging of the venturi.

It will be understood that the foregoing general description and the following detailed description as well are exemplary and explanatory of the invention but are not restrictive thereof.

The accompanying drawing, referred to herein and constituting a part hereof, illustrates one embodiment of the invention, and together with the description, serves to explain the principles of the invention.

Brief description of the drawing

The drawing is a fragmentary schematic view, illustrating a purification apparatus constructed and arranged in accordance with the invention.

Description of the preferred embodiment

Referring now more particularly to the accompanying drawing, there is illustrated a preferred embodiment of the invention wherein the reference numeral 1 designates the lower part of any suitable vortex type cleaner and reference numeral 2 designates the following cleaner. Advantageously, cleaners 1 and 2 may be of the construction described in my copending application S.N. 668,621, filed Sept. 18, 1967, and the subject matter of that application is incorporated herein by reference.

The cone 1 is attached to a rejects collector 3 which is provided on the preceding cleaner and this collector 3 is connected to the collar 4 of the venturi 5, of which the entrance and discharge are designated by reference numerals 6 and 7, respectively.

A source of liquid under pressure, for example, the water pipe 8, on which are mounted the regulating valve 9 and the pressure gauge 10, is connected to the entrance of the venturi 5, the discharge of which is connected by a pipe 11 to the upper part of the following cleaner 2, to which is also connected a branch pipe 12 which is attached to the pipe 8 at the point 13, situated ahead of the venturi.

Finally, another branch pipe 14 also is connected at 13 to the collector 3, the regulating valves 15 and 16 being mounted in the branch pipes 12 and 14, respectively.

It will be apparent from the foregoing that when the pipe 8 is fed with water under pressure, it carries away the rejects from the collector 3 and transfers them to the cleaner 2. By regulating the valve 15, it is possible to control the quantity of rejects evacuated at point 17 from the cleaner 2; then by regulating the valve 16 it is also possible to dilute to the desired degree the rejects coming from the preceding cleaner and, by so doing, also prevents plugging of the venturi. Moreover, a greater or lesser opening of the valve 15 permits a larger or smaller amount of rejects to pass through the venturi, thereby creating a variable counter-pressure in the pipe 11 attached to the cleaner.

It will further be seen that the foregoing arrangement also provides a cleaning installation which is extremely flexible, which does not necessitate the employment of a pump between the stages, and which also permits the deaeration of the primary cleaner by means of the effect of the operation at the neck of the venturi.

The invention in its broader aspects is not limited to the specific embodiment herein shown and described but departures may be made therefrom within the scope of the accompanying claims, without departing from the principles of the invention and without sacrificing its chief advantages.

What is claimed is:

1. In an apparatus for the purification of liquid suspensions and the like including at least two stages of vortex cleaning means, the improvement therein which comprises: a rejects collector mounted below and attached to the cleaning means of the first of said two cleaning stages and discharging into the neck portion of a venturi, first conduit means connecting the inlet of said venturi to a source of liquid pressure, second conduit means connecting the outlet of said venturi to the upper end of the cleaning means of the second of said two cleaning stages, and primary branch conduit means connected between said first conduit means and said cleaning means of said second purification stage.

2. Apparatus as claimed in claim 1, including secondary branch conduit means connected between said first conduit means and said rejects collector.

3. Apparatus as claimed in claim 1, including a regulating valve in at least one of said primary and secondary branch conduit means.

References Cited

UNITED STATES PATENTS

| | | | |
|---|---|---|---|
| 2,391,863 | 1/1946 | Bowen. | |
| 2,277,053 | 3/1942 | Alexander | 210—528 X |
| 2,377,524 | 6/1945 | Samson | 209—211 |
| 2,756,965 | 7/1956 | Howe | 209—162 |
| 2,886,287 | 5/1959 | Croley | 209—211 X |
| 2,965,522 | 12/1960 | Crespin | 209—211 X |
| 3,039,608 | 6/1962 | Wikdahl | 209—211 |
| 3,208,592 | 9/1965 | Smith | 209—490 X |
| 3,419,152 | 12/1968 | Ramond | 209—211 X |

FOREIGN PATENTS 837,801    6/1960    Great Britain.

FRANK W. LUTTER, Primary Examiner

U.S. Cl. X.R.

55—261, 431; 209—144; 210—512.